United States Patent [19]

Machell et al.

[11] Patent Number: 5,219,510

[45] Date of Patent: Jun. 15, 1993

[54] METHOD OF MANUFACTURE OF CELLULOSE ESTER FILM

[75] Inventors: Julie S. Machell, Webster, N.Y.; I. Daniel Sand, Jonesborough, Tenn.

[73] Assignee: Eastman Kodak Company, Rochester, N.Y.

[21] Appl. No.: 588,650

[22] Filed: Sep. 26, 1990

[51] Int. Cl.$^5$ .......................... B29C 41/26; B29K 1/00
[52] U.S. Cl. ................................ 264/210.6; 106/177; 264/210.7; 264/211; 264/211.11; 264/212; 264/290.2
[58] Field of Search ...................... 264/210.6, 211, 173, 264/188, 200, 207, 208, 330, 213, 290.2, 211.11, 218, 212, 210.7; 106/176, 177

[56] References Cited

U.S. PATENT DOCUMENTS

| | | | |
|---|---|---|---|
| 1,928,031 | 9/1933 | Renard | 264/218 |
| 2,088,642 | 8/1937 | Dreyfus | 264/218 |
| 2,196,768 | 4/1940 | Hiatt . | |
| 2,698,967 | 1/1955 | Reichel et al. | 264/290.2 |
| 2,782,128 | 2/1957 | Paist et al. | 106/177 |
| 3,022,287 | 2/1962 | Mench et al. . | |
| 3,280,234 | 10/1966 | Osborn | 264/290.2 |
| 3,291,625 | 12/1966 | Faraone et al. | 106/177 |
| 3,615,746 | 10/1971 | Brihegar et al. | 106/177 |
| 3,723,147 | 3/1973 | Wood et al. | 106/176 |
| 3,812,208 | 5/1974 | Esser et al. | 264/290.2 |
| 4,348,238 | 9/1982 | Krall | 264/213 |
| 4,388,431 | 6/1983 | Mauric et al. | 524/119 |
| 4,600,552 | 7/1986 | Sels et al. | 106/177 |
| 5,011,637 | 4/1991 | Overman et al. | 264/211.11 |

FOREIGN PATENT DOCUMENTS

| | | |
|---|---|---|
| 264143 | 4/1988 | European Pat. Off. . |
| 60-250053 | 12/1985 | Japan . |
| 539429 | 9/1941 | United Kingdom ........... 264/211.11 |
| 1598744 | 9/1981 | United Kingdom . |

OTHER PUBLICATIONS

Derwent Abstract WPI Acc. No. 84-071065/12 (Japanese Kokai JP 59 [1984]-24,736).
Derwent Abstract WPI Acc. No. 84-103542/17 (Japanese Kokai JP 59 [1984]-45,351).
*Organic Syntheses*, Collected vol. 2, edited by A. H. Blatt, pp. 109-111.
*Encyclopedia of Polymer Science and Technology*, vol. 3, John Wiley & Sons, Inc., pp. 389-401 (1965).
Kirk-Othmer, *Encyclopedia of Chemical Technology*, 3rd Edition, vol. 5, Wiley-Interscience, New York, (1979), pp. 120-126.
Kirk-Othmer, *Encyclopedia of Chemical Technology*, 3rd Edition, vol. 6, Wiley-Interscience, New York (1979), pp. 163-171.
R. M. Aseeva et al., *Adv. in Polymer Science*, 70, p. 217 (1985).
Daihatchi Chemical Industry Co., Ltd., Product Guide.
Encyclopedia of Polymer Science and Engineering; 2d Edition, J. Wiley & Sons, Publ. (1985) pp. 158-200.
Eastman Plastics Brochure entitled Film and Sheet Extrusion from Tenite ® Cellulosic Plastics.

*Primary Examiner*—Jan H. Silbaugh
*Assistant Examiner*—Mathieu Vargot
*Attorney, Agent, or Firm*—Robert A. Gerlach

[57] ABSTRACT

A cellulose ester film which can be melt cast is manufactured by esterfying cellulose to form a cellulose acetate or cellulose acetate propionate having degrees of substitution of $DSac=1.9$ to 2.6, $DSpr=0$ to 0.9 and $DS_{OH}=0$ to 0.55 and melt compounding the resulting polymer with a non-volatile phosphoric acid ester. A film is formed by melt extruding the compounded polymer onto a cooling surface to form a solid film. The film is then biaxially oriented at 130° to 200° C. and a stretch ratio of 1.25× to 2.5× in both directions. The resulting product is a film of excellent properties such as surface smoothness, light transmission, low haze, low color, high elastic modulus and curl relaxation after aqueous processing. The melt cast film is useful as a photographic roll film to replace solvent cast cellulose triacetate.

11 Claims, No Drawings

METHOD OF MANUFACTURE OF CELLULOSE ESTER FILM

CROSS-REFERENCE TO RELATED APPLICATION

Reference is made to commonly-assigned application Ser. No. 588,210, of I. Daniel Sand, John A. Hyatt and Stephen S. Kelley entitled "Formulations of Cellulose Esters With Arylene-Bis(Diaryl) Phosphates" which is filed concurrently herewith, now U.S. Pat. No. 5,104,450.

1. Field of the Invention

This invention relates to a method of manufacturing a melt-cast cellulose ester film and to the resulting novel film which is useful as a photographic film base.

2. Background

For many years, solvent-cast cellulose triacetate film has been used as a photographic film support. Its physical characteristics and the dimensional uniformity and surface quality imparted by solvent casting have made cellulose triacetate the first choice for many photographic films.

Despite the excellent photographic properties of solvent-cast cellulose triacetate film, environmental concerns about solvents conventionally used in the casting of the films have created a need for a new method of manufacture of cellulose triacetate films or for a new kind of photographic film support. Unfortunately, cellulose triacetate cannot be melt-cast because its melting point is above its decomposition temperature. As for solvent casting of cellulose triacetate, no new solvents have been found which are more acceptable than the conventional ones.

One possible way to eliminate solvents is to melt cast a thermally stable polymer such as poly(ethylene terephthalate). Indeed, this type of polymer is used commercially for the manufacture of supports for photographic sheet films such as x-ray films and graphic arts films. It is not suitable, however, for many kinds of photographic films, including roll films for amateur cameras. In this use the polyester film develops curl or "core set" when wound on the film spool. Cellulose triacetate also develops curl when wound (and a certain amount of core set is desirable), but when the cellulosic film is processed in aqueous developing solutions the curl of the hydrophilic cellulosic film is relaxed and the film lies flat. Poly(ethylene terephthalate) films, on the other hand, do not relax their core set in aqueous baths so they are unsatisfactory for photographic roll films. Other polymers lack one or more of the combination of properties and capabilities that make cellulose triacetate successful as a photographic film support.

Esters of cellulose hydroxyl groups have been made over a wide range with both single and mixed acids for different uses. Cellulose diacetate ($DS_{ac}=2.45$), unlike the triacetate, has a sufficiently low melting point that, with adequate plasticizer addition, it can be melt extruded. Mixed esters, or replacement of acetyl groups of the triacetate with propionic or butyric groups can accomplish the same purpose. However, films previously made from these known cellulose ester compositions of lower acetyl content than the triacetate have been deficinet in properties that are necessary for photographic roll film supports, most notably in stiffness and heat distortion temperature.

In addition, the plasticizers and flame retardants previously used in melt-processable cellulose esters are volatile at extrusion temperatures and generate aerosols which can condense and create surface defects on the film. Hence a continued need exists for a melt cast film having the desired combination of properties for photographic film supports.

BRIEF SUMMARY OF THE INVENTION

In accordance with the present invention a method is provided for manufacturing a melt-cast cellulose ester film which meets the requirements for photographic film supports and especially which is useful as a support for photographic roll films. The method produces a film which has such required properties as curl relaxation, clarity, modulus and the like and which is melt cast, thus eliminating undesirable solvents.

In the method of the invention a film is formed from a cellulose acetate or cellulose acetate propionate polymer having degrees of substitution in the ranges, $DS_{ac}=1.9$ to 2.6, $DS_{pr}=0$ to 0.9 and $DS_{OH}=0$ to 0.55, which is melt compounded with a non-volatile phosphoric acid ester by extruding the molten compounded cellulose ester substantially in the absence of a solvent through a film-forming die onto a cooling surface to form a solid film; and biaxially orienting the film at a temperature from about 130° to about 200° C. at a stretch ratio from $1.25\times$ to $2.5\times$ in both directions of orientation.

The resulting melt-cast cellulose ester film has a smooth surface and excellent qualities of light transmission, low haze, stiffness and dimensional stability. In addition it has little or no curl after aqueous processing.

The invention also provides a novel film which has the required properties for a photographic roll film. The film is defined as a biaxially-oriented, melt-cast cellulose ester film comprising a cellulose ester of which the ester groups are acetate alone or acetate and propionate, having degrees of substitution in the ranges $DS_{ac}=1.9$ to 2.6, $DS_{pr}=0$ to 0.9 and $DS_{OH}=0$ to 0.55 and, preferably, $DS_{ac}=2.1$ to 2.45, $DS_{pr}=0.2$ to 0.6 and $DS_{OH}=0.2$ to 0.4, the cellulose ester being melt compounded with a non-volatile phosphoric acid ester, the latter being an arylene bis(diaryl phosphate) or a compound of the formula

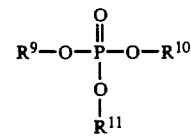

wherein $R^9$, $R^{10}$ and $R^{11}$ are polynuclear aromatic radicals.

The film is further defined as being biaxially oriented at a stretch ratio from $1.25\times$ to $2.5\times$ in both directions of orientation; and as having characterizing properties which include: a yellowness index less than 4, a percent haze less than 2, an elastic modulus greater than 3.1 GPa and, preferably, greater than 3.45 GPa, and curl after aqueous processing (also called "post-processing curl") less than 2 mm$^{-1}$.

DETAILED DESCRIPTION

As used herein, the following terms have the meanings indicated:

"Percent Transmission" means the percentage of incident light across the entire visible spectrum which is transmitted by film having a thickness of 4 mils (0.1 mm). The value is measured by the procedure of ASTM D1003, Standard Test Method for Haze and Luminous Transmittance of Transparent Plastics.

"Yellowness Index" means the value measured for a film having a thickness of 4 mils (0.1 mm) according to ASTM D1925, Standard Test Method for Yellowness Index for Plastics.

"Refractive Index" means the value measured according to ASTM D542-50, Standard Test Method for Index of Refraction of Transparent Organic Plastics.

"Percent Haze" means the value measured for a film having a thickness of 4 mils (0.1 mm) according to ASTM D1003.

"Elastic Modulus" and "Young's Modulus" mean the value in GPa measured according to ASTM D882, Standard Test Method for Tensile Properties of Thin Plastic Sheeting.

"Percent Elongation to Break" means the percentage measured according to ASTM D882.

"Breaking Strength" means the value in MPa measured according to ASTM D882.

"Tear Strength" means the value in g/5 mil measured according to ASTM D1938.

"Heat Distortion Temperature" is the temperature in degrees C measured according to ASTM D1637, Standard Test Method for Tensile Heat Distortion of Plastic Sheeting.

"Humidity Expansion Coefficient" means the value measured according to ANSI PH 1.32.

"Core Set" is a value measured by winding a strip of 35 mm film on a core of 12 mm diameter and storing at 50° C. for 16 hours. The reciprocal of the radius (R) in mm of the curvature of the film multiplied by 100 after removal from the core is the measured value (100/R, mm$^{-1}$).

"Post Processing Curl" (abbreviated as PP Curl) is the measured value on an ANSI curl gauge according to ANSI PH 1.29 (1971) for a film strip which, after the "Core Set" measurement, is soaked in water for 10 minutes at 38° C. and then equilbrated to 20° C. and 50% Relative Humidity. As with "core set", the measured value is the reciprocal of the radius, R, in mm of the curvature of the film multiplied by 100 (100/R, mm$^{-1}$).

"IV" means the Inherent Viscosity of a polymer as measured with a Ubbelohde viscometer at 25° C. in a solvent consisting of phenol and tetrachloroethane (60:40 parts by weight), the polymer concentration being 0.5 g per 100 ml of solvent.

"Evaporation Rate" is expressed in weight percent per hour and is measured by thermogravimetric analysis using a TGS-II Thermobalance of Perkin Elmer Company. The sample, in an amount of 5 to 10 mg, is placed in the ¼ inch diameter pan of the thermostatted microbalance. A nitrogen atmosphere is maintained in the apparatus with a nitrogen flow rate of 60 cc/min and at atmospheric pressure. The temperature is raised from room temperature at a rate of 25° C./min and then maintained at 250° C. Measurements of weight loss of the sample are made over a period of three hours. Under these conditions the evaporation rate approximates a linear function of time for a major portion of the measurement period.

"$DS_{ac}$" means the degree of substitution of acetate groups for hydroxyl groups in the esterified cellulose per anhydroglucose unit.

"$DS_{pr}$" means the degree of substitution of propionate groups for hydroxyl groups in the esterified cellulose per anhydroglucose unit.

"$DS_{OH}$" means the remaining non-esterified hydroxyl content of the esterified cellulose per anhydroglucose unit.

The desired properties for a photographic roll film support fall into three broad categories - optical, mechanical and dimensional properties. Properties in these categories are as follows:

Optical: As a support for silver halide photosensitive imaging layers, the film base must possess optical properties for a wide range of negative and positive or reversal films. High transmission of light across the entire visible spectrum is desirable and should be greater than 90 percent. The percent haze should be less than 2 and preferably, less than 1. For greatest latitude of sensitometric design, the inherent color of the support should be minimal. In particular, the yellowness index should be less than 4 and, preferably, less than 3. The refractive index of the support should be similar to that of the photosensitive layers, to minimize the halation impact of reflected stray light Given that gelatin in whole or in part is the major vehicle for silver halide photosensitive layers, the most desirable refractive index is close to 1.52. Refractive index values greater than about 1.55 necessitate the addition of dyes to the film base to counter the effects of stray light reflection. A most important aspect of optical performance in film supports is the surface quality of the material, which is greatly influenced by the manufacturing process. Lines, streaks, mottle and other surface imperfections that can occur in melt casting of films are undesirable or unacceptable in photographic film supports.

Mechanical: The stiffness (Young's Modulus) of silver halide photographic film supports should be above 3.1 GPa, and preferably above 3.45 GPa. The drying of the photosensitive layers exerts substantial shrinkage stresses. Stiffer supports give desired film flatness with less dependence on back pelloid coatings. In addition, depending on the humidity expansion of the film, stiff supports may give less curl amplitude with post coating humidity changes. All factors that contribute to film flatness during imaging and subsequent printing and/or projection are desirable.

The breaking strength, elongation to break and tear strength of a photographic film base must be appropriate for mechanical environments in the factory and in imaging and photofinishing systems. In general it is known that breaking strengths of less than 65 MPa and elongations less than 15% are undesirable, because the final product would be unable to survive normal wear and tear. On the other hand, break strengths of greater than 150 MPa, elongations of more than 75% and tear strengths of 100 gms or greater are also undesirable in that such a product is stronger than mechanical components in certain precision imaging systems and is difficult to slit and perforate with accuracy, high rate and yield.

Dimensional: The heat distortion temperature should be greater than 130° C. so that the film support can be used in conventional coating and drying processes, and survive the thermal transients encountered in distribution and customer use. The humidity expansion coefficient should be less than $5.5 \times 10^{-3}$ percent per percent relative humidity for precision imaging applications. The core set of the film as previously defined, should be positive, but not excessively so. Even more important is the post-processing curl remaining in the film support after immersion in water or aqueous solutions during the photofinishing process. This should be less than 2.0 and, preferably, less than 1.5 mm$^{-1}$.

In the manufacture of the novel cellulose ester film in accordance with the invention a series of steps are carried out. These include (1) esterification of cellulose, (2) melt compounding of the cellulose ester with a low volatility phosphoric acid ester and other addenda, (3) extruding the cellulose ester as a film and (4) biaxially orienting the film to achieve the necessary surface properties and other qualities.

The method also, of course, includes carrying out the extrusion and orientation of steps (3) and (4) with a previously esterfied and compounded cellulose ester composition. It should also be understood that steps (2) and (3) can be carried out substantially at the same time in a single apparatus.

Esterification—Hydroxyl groups of the cellulose are esterified with acetyl groups or both with acetyl groups and propionyl groups. The degrees of substitution are important for achieving a melting point of the cellulose ester polymer which is sufficiently low for melt extrusion and for achieving necessary physical properties. Procedures for esterification of cellulose are well known and such known procedures can be used in the present method. Useful procedures are disclosed, for example, in U.S. Pat. Nos. 2,196,768 and 3,022,287 which are incorporated herein by reference. See also Kirk-Othmer Encyclopedia of Chemical Technology, 3d Edit. Vol. III, p. 163-171.

One useful esterification procedure is to react acetic acid, propionic acid and/or their anhydrides with a purified form of cellulose, such as cotton linters, using sulfuric acid as a catalyst. The esterification reaction is stopped by the addition of water and then the polymer is partially hydrolyzed to obtain the desired degree of substitution of the hydroxyl groups. The hydrolysis is monitored and stopped at the desired point by adding magnesium carbonate dissolved in aqueous acetic acid to neutralize the catalyst. Thereafter, the polymer is precipitated, washed and dried in known manner.

Any such known cellulose esterification methods can be used which will form a cellulose ester of high purity and having the required degrees of substitution. The latter are as follows: $DS_{ac}$=1.9 to 2.6, $DS_{pr}$=0 to 0.9 and $DS_{OH}$=0 to 0.55. A preferred embodiment has both acetate and propionate groups and its degrees of substitution are in the following ranges: $DS_{ac}$=2.0–2.45; $DS_{pr}$=0.2–0.7; and $DS_{OH}$=0.2–0.4. It will be noted that the preferred composition has a significant content of hydroxyl groups. It has been found that this characteristic contributes significantly to the valuable properties, e.g., heat distortion temperature.

Compounding—The compounding of the described cellulose ester resin with desired addenda is also carried out in known manner, for example, by melt blending the ingredients on a heated two-roll mill, a twin screw extruder or in the extruder which feeds the film die. A most important aspect of the compounding step is the selection of a particular type of phosphoric acid ester to blend with the cellulose ester. In the past, the additives which were blended with melt-processed cellulose esters, such as molding polymers, to provide chemical stabilization, flame retardancy and viscosity reduction (to facilitate extrusion) have had significant vapor pressures at the processing temperatures. As previously mentioned, this leads to the formation of undesired condensate on the extruded polymer surfaces.

Phosphate esters such as triphenyl phosphate, have been used in cellulose polymers to provide both flame retardancy and plasticization. Such volatile phosphate esters have resulted in reduced content in the final product and have required equipment for recovery of the condensate.

In accordance with the present invention non-volatile esters of phosphoric acid are used. By "non-volatile" is meant that they have a very low vapor pressure and are of markedly lower volatility than triphenyl phosphate. More specifically, the non-volatile phosphate esters used in the method of the present invention have an evaporation rate which is less than 10 weight percent per hour at a melt casting temperature of 250° C. The preferred phosphate esters, which result in films of the best surface quality, have an evaporation rate at 250° C. less than 5, weight percent per hour and, most preferably, less than 1 weight percent per hour as measured by the procedure described above under "Evaporation Rate".

Particular non-volatile phosphoric acid esters for the films of the present invention are arylene bis (diaryl phosphate) esters or are esters of the structure

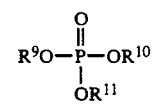

wherein $R^9$, $R^{10}$ and $R^{11}$ are the same or different polynuclear aromatic radicals.

Representative arylene bis(diaryl phosphate) compounds are of the structure

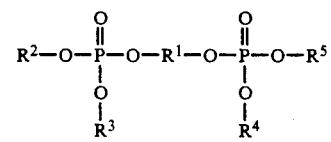

wherein
$R^1$ is selected from one of the following structures:

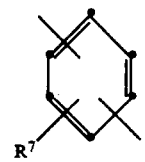

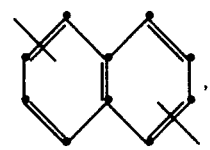

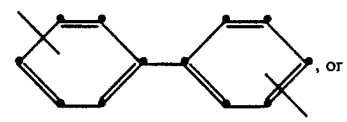

-continued

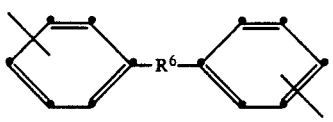

wherein any of the above $R^1$ structures may be substituted with one or more halogen atoms, $R^2$ is

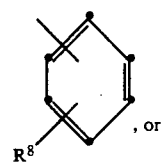

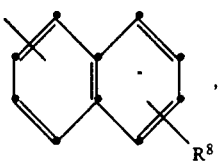

each of $R^3$, $R^4$, and $R^5$, independently, has the same meaning as $R^2$,

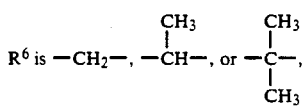

$R^7$ is H, aryl, haloaryl, a $C_1$-$C_8$ straight or branched chain alkylene, a $C_1$-$C_8$ straight or branched chain alkylene substituted with one or more halogen atoms, or a $C_1$-$C_8$ oxyalkylene, and $R^8$ is $R^7$ or a halogen atom.

In structure I above, the polynuclear aromatic radicals $R^9$, $R^{10}$ and $R^{11}$ are aryl radicals of at least 10 ring carbon atoms and such radicals having one or more substituents such as alkyl, alkoxy radicals or hydroxy alkyl radicals of 1 to 8 carbon atoms and halogen. The term "polynuclear", as used herein, means two or more aromatic hydrocarbon rings, including fused ring structures as in the naphthanyl radical. It should be understood that an important property of these phosphate esters is their low volatility which is characteristic of such aryl esters of much higher molecular weight than triphenyl phosphate. Therefore, the particular substituents on the aryl groups can vary considerably provided they do not render the phosphate ester incompatible with the cellulose ester and do not destroy the plasticizing effect of the phosphate ester.

Examples of the polynuclear aryl radicals $R^9$, $R^{10}$ and $R^{11}$ of structure I include 1-naphthyl, 2-naphthyl; 1-, 2- or 3- biphenyl and a radical of the structure

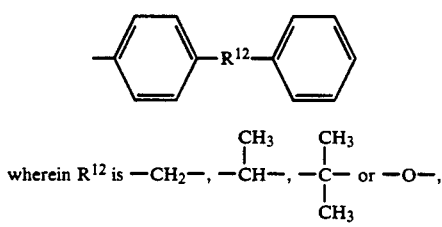

and such radicals substituted with one or more of the types of substituents referred to above, especially lower alkyl.

Highly preferred are arylene bis(diaryl phosphate) esters such as 1,4-phenylene-tetraphenyl phosphoric acid ester. It can be represented as follows:

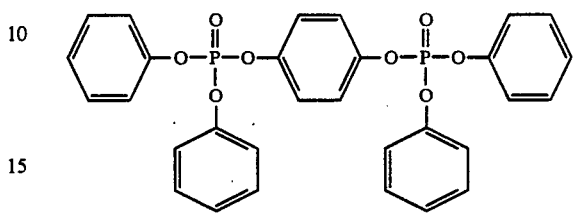

Methods of preparing such arylene bis (diaryl) phosphates and examples of other useful compounds of the class are disclosed in the concurrently filed application of Sand et al, cited at the start of this specification, the disclosure of which is incorporated herein by reference.

Other preferred non-volatile phosphate esters include compounds of the following structures:

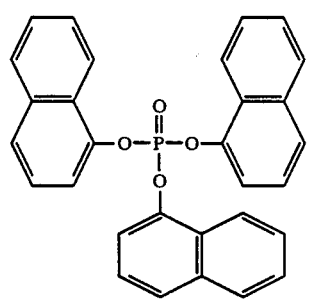

Trinaphthyl Phosphate and

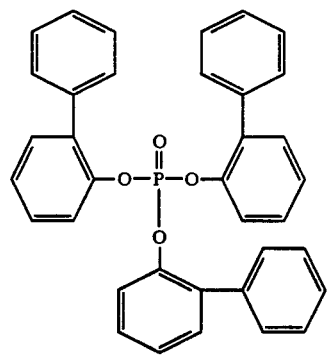

Tris Ortho-biphenyl Phosphate

Compounds of these types are disclosed, for example, in U.S. Pat. Nos. 3,356,471 and 4,683,255 for other purposes. These patents are incorporated herein by reference.

The low evaporation rate of the non-volatile phosphoric acid esters used in the films of the invention is illustrated by the following table. It compares the non-volatile phosphates with the conventional plasticizer and flame retardant, triphenyl phosphate, and with tri xylyl phosphate, the measurements being made as described above in the definition of "Evaporation Rate".

| Compound | (Weight Loss Rate, %/Hr.) |
| --- | --- |
| 1) Tri Phenyl Phosphate | 164.0 |
| 2) diTPP* | 0.2 |
| 3) Tri Naphthyl Phosphate | 0.2 |
| 4) Tri Xylyl Phosphate | 19.3 |
| 5) Tris Ortho-Biphenyl Phosphate | 0.4 |

*diTPP = 1,4-phenylene-tetraphenyl phosphoric acid ester

These results show that the non-volatile phosphates used in the films of the invention, i.e., (2), (3) and (5), have evaporation rates much less than 10 weight percent per hour. In fact, these preferred compounds evaporate at rates less than 1 weight percent per hour.

Although compounding of the cellulose ester with a non-volatile phosphoric acid ester is a distinguishing characteristic of the method and film of the invention, it is also desirable to include other functional addenda which can be of conventional types. For example, to reduce the required amount of phosphoric acid ester it is possible to include a conventional plasticizer such as poly(ethylene glycol). Other useful plasticizers include, for example, "Admex 522" polyester, a product of Hüls America Company.

The concentration of phosphoric acid ester to provide both flame retardancy and plasticization can be, for example, from about 6 to 20 weight percent and preferably is from about 8 to 15 weight percent based on the cellulose ester. However, if one of the other indicated plasticizers is added in amount, for example, of 5 to 10 weight percent, the concentration of phosphoric acid ester can be reduced to 5 to 10 weight percent, provided that sufficient flame retardancy is retained.

It is known to add antioxidant stabilizers to cellulose esters and such an additive is desirable in the films of the invention. Useful stabilizers include p-tert-butylphenol, neopentylphenyl phosphite and strontium naphthenate, 2-ethylhexyl esters of epoxidized tall oil and linseed oil and a product of Ciba-Geigy Corp. known as "Irganox 1010" stabilizer which is identified as tetrakis [methylene (3,5-di-tert-butyl-4-hydroxyhydro-cinnamate)].

Such addenda are used in known concentrations sufficient to preserve the thermal and/or oxidative stability of the film.

Extrusion

After being dried, the formulated cellulose ester composition, for example, either dry mixed or compounded, is fed continuously to an extruder of conventional type. The extrusion melt temperature for the cellulose ester employed in accordance with the present invention is in the range from about 230° to 250° C. and preferably is from 235° to 245° C. A film die of conventional type is used to extrude a melt film of 0.1 to 0.6 mm (4 to 25 mils) in thickness. The extruded melt is cast onto a wheel, which serves as a cooling surface and is maintained at about 95° to about 140° C., depending on the specific composition of the cellulose ester. This temperature is adjusted to achieve a balance of wetting of the wheel and release from the wheel. Optionally, the film can be calendared and/or pinned electrostatically or by vacuum to the wheel, using conventional apparatus, before being stripped from the wheel for the next operation which is biaxial orientation.

Although compounding and extruding are discussed above as individual operations, it should be understood that both operations can be carried out in a single apparatus, as is known in the art. Thus, the cellulose ester and the addenda can be dry blended and then melt compounded by the extruder screw while being fed to the film extrusion die.

Orientation

The extruded sheet of compounded cellulose ester is biaxially oriented either sequentially or simultaneously. If done sequentially, the first stretching direction can be either the direction of travel of the web or transverse to that direction or any combination thereof. The ratio of final dimensions to cast dimensions can be from about 1.25× in both directions up to about 2.5× in both directions. Best results in terms of surface quality, stiffness, strength and heat distortion temperature, are obtained when the stretch ratio in both directions is in the range from 1.5 to 2.0×.

The temperature at which the orientation is conducted contributes to the properties of the oriented film. A temperature in the range from 130° to 200° C. can be used with the indicated stretch ratios, and best results are obtained from 140° to 180° C.

It should also be understood that, if desired, coatings, such as subbing layers to improve the adhesion of aqueous photosensitive emulsion layers, can be applied during the method of the invention, for example, between the extruding and orienting steps or during or after orientation.

The achievement of superior surface quality, which is much improved as compared with the film as cast, is an unexpected result of the use of the described moderate stretching conditions for cellulose ester films of the described chemical compositions. High stretch ratios, i.e., greater than 3×, are conventionally employed with crystallizable, strain-hardening resins such as poly (ethylene terephthalate). Cellulose esters, however, are relatively non-crystallizable and only slightly strain-hardening. It is unexpected to enhance surface optical quality and physical properties of a cellulose ester film at the low stretch ratios used in the method of the present invention. The discovery of the relationship between cellulose ester composition and orientation conditions which provides the unique combination of surface and physical properties has been made possible by a new technique for detecting surface irregularities and measuring surface roughness amplitude summation. This is described in more detail as follows:

Surface Quality Characterization

Surface quality of the cellulose ester films is characterized using an optical device. A length of 35 mm width film strip is transported by a motor at 1 inch/sec under collimated light over a non-revolving drum having a black felt surface. An optical sensor is positioned near the sample to collect the reflected light. A waveform, similar to a shadowgraph of the surface, is then constructed based on the reflected light intensity received.

The waveform is analyzed with a HP-3562A Dynamic Signal Analyzer of Hewlett Packard Company. First, the real time scan is Fourier transformed into the frequency domain to get the component frequencies that individually contain a fraction of the total amplitude. Second, the surface irregularity is quantified in microvolts$^2$ by summing all the amplitude components that correspond to the component frequencies. The larger this figure, the worse the surface quality.

The surface quality of unstretched melt cast films when measured in this manner, ranges from about 2000 to 8000 microvolts$^2$. Although such a surface may be acceptable in films used for packaging and other purposes, it is not suitable for photographic film supports. Measurements for films made by the method of the invention, which are useful as photographic film supports, are less than about 900 microvolts$^2$. Preferred films of the invention have surface quality measurements of less than 300 microvolts$^2$.

By using this sensitive optical technique applicants have discovered the orienting conditions (temperatures and stretch ratios) which, in combination with the particular cellulose ester and phosphate ester compositions, unexpectedly yield films of greatly improved surface quality and which also Possess other important qualities such as stiffness, dimensional stability, elongation-to-break and clarity which are in the ranges desired for photographic roll film.

The invention is further illustrated by the following working examples. Example A describes the preparation of a phosphate ester used in the method of the invention.

EXAMPLE A: PREPARATION OF 1.4-PHENYLENE-TETRAPHENYL PHOSPHORIC ACID ESTER (ALSO KNOWN AS Di-TPP)

1,4-Phenylene tetraphenyl phosphoric acid ester was prepared from hydroquinone, 32.7 gm, dissolved in 500 ml of pyridine. To this solution, chilled to 5° C. under a nitrogen purge was added 200 gm of diphenyl chlorophosphate, dropwise. After completion of the addition, the contents were allowed to warm to room temperature and maintained for 16 hours. 200 ml of water was added, and the product in the pyridine-water solution was added to 3 liters of water, inducing crystallization. The product was collected and recrystallized from methanol. The yield was 90% and the white, free-flowing granular solid had a melting point of 106°-107° C.

The synthesis of mixed esters of cellulose for use in the compositions of the invention is illustrated by the following Examples B and C.

Example B: PREPARATION OF CELLULOSE ACETATE PROPIONATE, $DS_{ac}$ 1.90, $DS_{pr}$ 0.71, I.V. of 1.51

Solution A was made up by dissolving 90 ml of concentrated sulfuric acid in 150 ml of propionic acid. Solution B was made up by dissolving 175 ml of concentrated sulfuric acid in 290 ml of propionic acid. Solution C was made by dissolving 40 lbs. of deionized water in 120 lbs of acetic acid. Solution D was made up by diluting 50 lbs of acetic acid with 50 lbs of water. Solution E consisted of 410 gm magnesium carbonate in a solution of 11 lbs. of acetic acid and 10 lbs of water. Solution F was made by dissolving 69 gm of potassium carbonate and 192 gm citric acid in 14.6 kg water. To begin the preparation, 95 lbs of acetic acid and 20 lbs of propionic acid were charged to a reactor equipped with a mechanical agitator and jacketed for heating and cooling.

Then 30 lbs. of cellulose derived from cotton lint was added and the charge raised to 130° F., and held at that temperature for 30 min. with stirring. The temperature was lowered to 90° F., and solution A was added. The batch was further cooled to 0° F. and 30 lb. acetic and 75 lb. of propionic anhyride were added. After 45 min, the reaction temperature had risen to 50° F., and solution B was added. In another three hours with the temperature at 130° F., solution C was introduced. This aqueous reaction solution was maintained at 140° F for 17 hours, after which solution D was added, stirred in and followed by solution E in 15 minutes. This aqueous, acidic solution of the ester was filtered. Finally, with the solution under vigorous agitation, water was added until polymer precipitation was observed. The white precipitate was collected and washed until less than 0.05% acetic acid. 240 ml of solution F was added to the wet product, followed by vacuum drying. The dry product assayed as the subject substituents and had 39 ppm total sulfur content.

EXAMPLE C; PREPARATION OF CELLULOSE ACETATE PROPIONATE with $DS_{ac}=2.10$, $DS_{pr}=0.50$ and an IV of 1.51

This product was prepared in a manner similar to Example 2, except that some amounts of reagents were different. The initial reactor charge consisted of 115 lbs. of acetic and 6 lbs of propionic acids. At the point where acetic anhydride and propionic anhydride were added in Example 2, 35 lb. and 68 lb. respectively were added in this example. Finally, 360 ml of solution F were added instead of the 240 ml of Example 2. The rest of the steps were equivalent in all aspects to those employed in Example 2. In addition to the indicated composition and viscosity, this product contained 53 ppm of sulfur.

EXAMPLES 1-2

Two compositions for films of the invention (Examples 1 and 2) were prepared by melt compounding a cellulose ester of Example B or C above with the nonvolatile phosphate ester of Example A and with other addenda as indicated in Table I below. The amounts of each component are indicated in parts by weight per hundred parts of cellulose ester. Addenda were, as shown in the table.

COMPARATIVE EXAMPLES

Comparative Example W was prepared by melt extruding a commercially available cellulose acetate ($DS_{ac}=2.45$) which contained the conventional plasticizer, diethyl phthalate, in an amount of 22.5 parts by weight per 100 parts of resin. The melt-extruded film was biaxially oriented 1.5× by 1.5×.

Comparative Example X was prepared by melt extruding a commercially available cellulose acetate propionate ($DS_{ac}=0.03$, $DS_{pr}=2.68$) which contained the conventional plasticizer bis-2-ethylhexyladipate in an amount of 1.5 parts by weight per 100 parts of resin. The melt-extruded film was biaxially oriented 1.5× by 1.5×.

Comparative Example Y was a solvent-cast cellulose triacetate film ($DS_{ac}=2.85$) which is manufactured commercially as a photographic film support.

Comparative Example Z was prepared by melt casing a cellulose acetate propionate composition as in Example 1 but the film was not biaxially stretched or oriented.

TABLE I

| MELT PROCESSABLE CELLULOSE ESTER COMPOSITIONS (Contents Based on 100 Parts of Resin) | | |
|---|---|---|
| Ingredient | Example 1 | Example 2 |
| Resin | Example B | Example C |
| Di-TPP | 16 | 18 |

TABLE I-continued

MELT PROCESSABLE CELLULOSE ESTER
COMPOSITIONS (Contents Based on 100 Parts of Resin)

| Ingredient | Example 1 | Example 2 |
|---|---|---|
| Epoxidized Tall Oil | 0.6 | 0.6 |
| Para-tertiary-butyl phenol | 0.4 | 0.4 |
| Neopentyl phenyl phosphite | 0.07 | 0.07 |
| Strontium naphthoate (50% in mineral oil) | 0.02 | 0.02 |

Films were prepared by melt extruding and biaxially orienting (1.5× in both directions) the compound resin compositions of Examples 1–2. These and the Comparative Examples W, X, Y and Z were then tested by the procedures previously mentioned. The results of testing the examples of the invention and the comparative examples as well as the extrusion and stretch conditions, are reported in Table II.

TABLE II

| | Example 1 | Example 2 | Comp. W | Comp. X | Comp. Y | Comp. Z |
|---|---|---|---|---|---|---|
| % Trans. | 94.4 | 93.9 | 94.4 | 94.2 | 94 | 94.2 |
| YID | 1.9 | 2.16 | 0.1 | 0.1 | 0.4 | 1.5 |
| Refrac. Index | 1.49 | 1.49 | 1.49 | 1.47 | 1.48 | 1.49 |
| % Haze | 0.83 | 1.23 | 4.85 | 0.69 | 0.74 | 0.21 |
| Mod. (GPa) | 3.48 | 3.45 | 3.38 | 2.55 | 3.8 | 2.83 |
| E. to B. (%) | 22 | 19 | 27 | 26 | 25 | 34 |
| Tear Str. (gm) | 15/3.34 mil | 14/4.28 mil | 19/4.1 mil | 13/3.38 mil | 26/4.74 mil | 29/3.91 mil |
| HDT (°C.) | 139 | 147 | 143 | 133 | 150 | 125 |
| HEC (%/%RH) | 0.0039 | 0.0045 | 0.0051 | 0.0033 | 0.005 | 0.0056 |
| Core Set (100/R, mm$^{-1}$) | 10.87 | 9.76 | 11.81 | 11.02 | 10.71 | 11.81 |
| PP Curl (100/R, mm$^{-1}$) | 0.98 | 1.42 | 1.89 | 2.05 | 1.26 | 1.73 |
| Processing Conditions | | | | | | |
| Extrusion T. (°C.) | 238 | 242 | 235 | 248 | — | 238 |
| Stretch T. (°C.) | 160 | 155 | 155 | 135 | — | — |
| Stretch Ratio (X) | 1.5 × 1.5 | 1.5 × 1.5 | 1.5 × 1.5 | 1.5 × 1.5 | none | none |

Table II shows that all of the films had good light transmission of at least about 94%. This means that the films of the invention (Examples 1 and 2) were as acceptable in this regard as the solvent cast cellulose triacetate film (Comp. Example Y) which is used commercially as a photographic roll film support. The films of the invention were also satisfactory for yellowness index, which is a quality that is extremely difficult to achieve with melt-cast cellulosic films having the other desired properties. It should be noted that two experimental films of cellulose acetate and cellulose acetate propionate which were otherwise like films of the invention were somewhat high in yellowness index. The reason is believed to be that during compounding of these films the extruder temperature control malfunctioned and the polymer composition was overheated. These two films otherwise possessed the valuable properties desired for photographic film supports. By control of the processing conditions, e.g., the compounding and extrusion temperatures, to avoid degradation of the polymer and color formation, films of the invention having even lower yellowness index than Examples 1 and 2 can be made. For the preferred compositions of the invention, the temperature is maintained below about 250° C., and, most preferably, in the range from 235° to 245° C.

Table II also shows that haze measurements of the two films of the invention were satisfactorily low, but haze was excessive in Comparative Example W which contained diethyl phthalate as the plasticizer instead of a non-volatile tri-aryl ester of phosphoric acid.

In addition, the volatile plasticizer in this film W and in the film of Comparative Example X vaporized excessively during extrusion. The volatiles condensed on the film surface and on the processing apparatus.

The results for Comparative Example X, of which the cellulose ester was cellulose acetate propionate of excessively low acetate content, show that the elastic modulus was too low. Also the post-processing curl (2.05) was higher than desired for a photographic roll film.

The results for the film of Comparative Example Z which was of the same composition as Example 1, but was not biaxially oriented, show that both the elastic modulus (2.83) and the heat distortion temperature (125° C.) were too low.

The surface quality of several other films has also been measured by the optical technique described above in the discussion of "Surface Quality Characterization". These films include a conventional solvent-cast cellulose triacetate film (a), and three films (b), (c) and (d) which are cellulose diacetate ($DC_{ac}$=2.45) films each containing the non-volatile plasticizer of Example A in a concentration of 18 parts by weight per 100 parts of resin. Film (b) is melt-cast but not biaxially oriented. Film (c) is biaxially-oriented at 1.5× by 1.5× and film (d) is biaxially oriented at 2.0× by 2.0×. Films (c) and (d) are films of the invention. A comparison of the surface qualities of these four films is provided by the surface quality measurements listed in the following Table.

TABLE III

| Film | Total Surface Irregularity (Microvolts$^2$) |
|---|---|
| (a) - Solvent Cast CTA | 284 |
| (b) - Melt Cast CA | 5234 |
| (c) - 1.5X by 1.5X Biaxially Oriented CA | 271 |
| (d) - 2.0X by 2.0X Biaxially Oriented CA | 127 |

The results listed in Table III provide a quantitative comparison of films of the invention (c and d) with the other films. They show that the films of the invention (c) and (d) are as smooth as or smoother than the standard film for photographic roll film supports, namely, solvent-cast cellulose triacetate, i.e., film (a). The unstretched, melt-cast cellulose acetate, film (b), had a surface that was unacceptable for photographic film supports. The moderate orientation of the method of the invention, as in films (c) and (d), markedly improved the surface quality as compared with the unstretched film (b).

In summary, the data in Tables II and III show that the films of the invention are superior to the comparative examples in properties which are difficult to achieve in a melt cast cellulosic film, such as good surface quality, low yellowness index, low haze and good elastic modulus. Moreover, in achieving these properties, the films of the invention retain or do not sacrifice other desired properties for a photographic roll film such as post-processing curl relaxation.

The films of the invention can be used for a number of purposes for which transparent, hydrophilic films are suited. Their greatest value, however, resides in their use as photographic film supports. In this use the capability of melt casting plus the combination of useful properties makes such films especially valuable. Accordingly, one embodiment the invention includes an aqueous-processable light sensitive photographic element which comprises a melt cast cellulosic film support of the type described herein on which are coated one or more photographic layers such as a subbing layer, one or more light-sensitive silver halide emulsion layers, a pelloid layer and the like. Such photographic elements are especially useful as photographic roll films. Their curl relaxation after aqueous processing, their optical quality, and physical and dimensional properties make them well adapted for such use.

The invention has been described in detail with particular reference to preferred embodiments thereof, but it will be understood that variations and modifications can be effected within the spirit and scope of the invention.

We claim:

1. The method of manufacture of a photographic roll film support which comprises
    esterifying cellulose to form a cellulose ester of which the ester groups are acetate alone or acetate and propionate and of which the degress of substitution are in the ranges, $DS_{ac}=1.9$ to 2.6, $DS_{pr}=0$ to 0.9 and $DS_{OH}=0$ to 0.55;
    melt compounding the resulting cellulose ester with a phosphoric acid ester;
    melt casing a film by extruding the molten compounded cellulose ester through a film-forming die onto a cooling surface to form a solid film, wherein said melt casing step is carried out substantially in the absence of solvent and wherein said phosphoric acid ester is non-volatile at melt casting conditions; and
    biaxially orienting the film at a temperature from about 130° to about 200° C. and at a stretch ratio from 1.25× to 2.5× in both directions of orientation.

2. A method of according to claim 1 wherein the degrees of substitution in the cellulose ester are in the ranges, $DS_{ac}=2.10$ to 2.45, $DS_{pr}=0.2$ to 0.6 and $DS_{OH}=0.2$ to 0.4.

3. A method according to claim 1 wherein the phosphoric acid ester is of the structure:

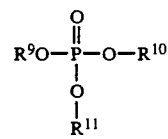

and $R^9$, $R^{10}$ and $R^{11}$ are polynuclear aryl radicals.

4. A method according to claim 1 wherein the phosphoric acid ester is trinaphthyl phosphate.

5. A method according to claim 1 wherein in the phosphoric acid ester is tris ortho-biphenyl phosphate.

6. A method according to claim 1 wherein the phosphoric acid ester is an arylene bis(diaryl phosphate).

7. A method according to claim 6 wherein the phosphoric acid ester is of the structure:

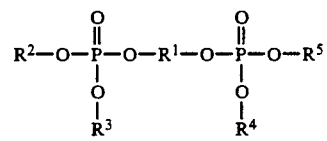

wherein
$R^1$ is selected from one of the following structures:

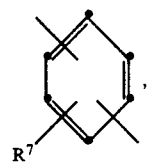

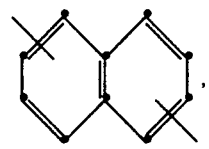

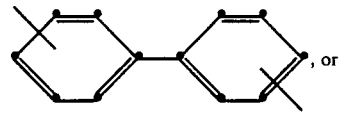

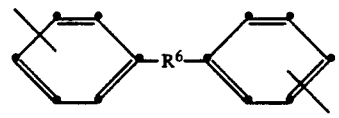

wherein ay of the above $R^1$ structures may be substituted with one or more halogen atoms, $R^2$ is

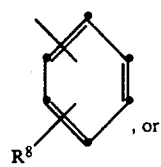

-continued

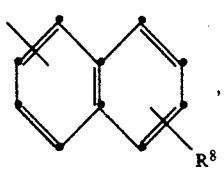

each of $R^3$, $R^4$, and $R^5$, independently, has the same meaning as $R^2$,

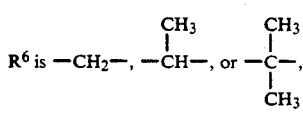

$R^7$ is H, aryl, haloaryl, a $C_1$-$C_8$ straight or branched chain alkylene, a $C_1$-$C_8$ straight or branched chain alkylene substituted with one or more halogen atoms, or a $C_1$-$C_8$ oxyalkylene, and $R^8$ is $R^7$ or a halogen atom.

8. A method according to claim 1 wherein the cellulose ester is compounded with at least one other addendum selected from the group consisting of stabilizers, plasticizers and flame retardants.

9. A method according to claim 1 wherein a photographic film support is manufactured having a percent haze less than 2, a yellowness index less than 4, an elastic modulus greater than 3.1 GPa and post-processing curl less than 2 $mm^{-a}$.

10. A method of manufacture of a photographic roll film support which comprises extruding a molten compounded cellulose ester at a temperature below about 250° C. through a film-forming die onto a cooling surface to form a solid film, wherein said extruding step is carried out substantially in the absence of solvent, said compounded cellulose ester comprising (1) a cellulose ester of which the degrees of substitution are in the ranges, $DS_{ac}=1.9$ to 2.6, $DS_{pr}=0$ to 0.9 and $DS_{OH}=0$ to 0.55, and (2) a phosphorice acid ester which is nonvolatile at extrusion conditions and biaxially orienting the extruded film at a temperature from about 130° to about 200° C. and at a stretch ration from 1.25× to 2.5× in both directions of orientation.

11. A method according to claim 10, wherein the degrees of substitution are in the ranges, $DS_{ac}=2.1$ to 2.45, $DS_{pr}=0.2$ to 0.6 and $DS_{OH}=0.2$ to 0.4 and wherein the film is extruded at a temperature from about 235° to about 245° C.

* * * * *